United States Patent [19]

Bose et al.

[11] Patent Number: 5,327,711
[45] Date of Patent: Jul. 12, 1994

[54] BALER FEEDING APPARATUS

[75] Inventors: Keith E. Bose; Cecil R. Sudbrack, both of New Holland, Pa.

[73] Assignee: Ford New Holland, Inc., New Holland, Pa.

[21] Appl. No.: 40,966

[22] Filed: Mar. 31, 1993

[51] Int. Cl.$^5$ .................. B30B 1/00; A01D 87/08
[52] U.S. Cl. ................... 56/341; 100/142; 100/189; 198/722
[58] Field of Search ............... 198/722, 734; 100/188 R, 899, 142, 143; 56/341

[56] References Cited

U.S. PATENT DOCUMENTS

| | | |
|---|---|---|
| 2,450,082 | 9/1948 | Crumb . |
| 3,115,823 | 12/1963 | Nolt et al. . |
| 3,570,395 | 3/1971 | Eberly et al. ............ 100/189 |
| 3,724,363 | 4/1973 | Nolt et al. ............ 100/189 |
| 4,488,636 | 12/1984 | De Coene ............ 198/608 |

FOREIGN PATENT DOCUMENTS 2720883 11/1977 Fed. Rep. of Germany ...... 100/189

OTHER PUBLICATIONS

Ford New Holland, Inc. Brochure on 16×18 Baler-1991.

Primary Examiner—David J. Bagnell
Attorney, Agent, or Firm—Frank A. Seemar; Larry W. Miller

[57] ABSTRACT

An agricultural baler for making square bales of crop material having a bale case, a feed platform adjacent the bale case and a pickup in front of the platform for lifting crop material from the to the platform. A first feed mechanism, including a first set of crop engaging tines, is provided for urging crop material across the feed platform toward the bale case. Intermediate the first feed mechanism and the bale case is a second feeding mechanism having a second set of crop engaging tines for urging the crop material across the platform from said first feed mechanism into the crop inlet. The first and second sets of crop engaging tines are driven through endless paths each having arcuate portions in the vicinity of the feed platform and along which the tines travel in the general direction of the bale case. The paths of the second set of tines pass through said inlet into the bale case and are offset from the first set transversely relative to the general direction crop is being urged across the platform. A unique filler arrangement comprising a generally wedge shaped element affixed to the feed platform is provided to fill the space between the arcuate portions of the endless paths and the floor to prevent crop buildup in such space.

18 Claims, 3 Drawing Sheets

BALER FEEDING APPARATUS

FIELD OF THE INVENTION

This invention relates generally to agricultural balers and more particularly to an improvement that enhances the operational characteristics of feeding systems for such balers.

BACKGROUND OF THE INVENTION

Present day agricultural balers pick up crop material, such as straw or hay, from a windrow or swath lying on the ground, deposit it in an infeed housing where it is conveyed across a feed table by a feeding mechanism through an inlet to a bale forming chamber. In the bale forming chamber the crop material is compressed by a reciprocating plunger to form a bale that is automatically tied by a tying mechanism before being discharged through the rear of the baler onto the ground or into a trailing wagon.

Exemplary of feeder mechanisms used in the above described type baler is the feeder disclosed in U.S. Pat. No. 2,450,082, issued Sep. 28, 1948. In this early baler a rotating auger is employed to move crop material from the pickup to the bale forming chamber.

In other feeding mechanisms known in the art, the same general result is achieved by varying arrangements of feed fingers moving the crop material from the pick up to the bale forming chamber, such as illustrated by the apparatus disclosed in U.S. Pat. No. 3,115,823, issued Dec. 31, 1963. Other well known feed mechanisms of the same general type are illustrated in U.S. Pat. No. 3,724,363, issued Apr. 8, 1973 and U.S. Pat. No. 3,570,395, issued Mar. 16, 1971.

One particular prior art baler feeder utilizes a series of similar side-by-side rotary feeders in combination with a packer fork mechanism that act together to convey crop material into the baling chamber, e.g., see U.S. Pat. No. 4,488,366, issued Dec. 18, 1984. It is this general type of feeder is one type of arrangement, i.e., a series of similar rotating feeder mechanisms, for which the instant invention provides an improvement.

While the performance of all the aforementioned feeders is generally satisfactory, the requirements and demands of farmers are increasing with the need to optimize that performance to yield uniformly dense bales with consistent rectangular shape. This enhanced density and shape improves the handling of bales and obviates their tendency to disintegrate.

It is not uncommon to obtain poor bale shape caused by feed mechanisms that do not deliver crop far enough into the bale case, i.e., the hay receiving portion of the bale forming chamber. In many instances large quantities of material are deposited at the transition between the feed chamber and the bale case. During operation the plunger travels rearwardly past the feed opening whereupon a knife carried on the plunger cooperates with a fixed knife on the rear edge of the feed opening to shear such crop material left in the transition area. In situations of this nature the crop material left behind is fed over into the bale case with the next slug of material during the next working stroke of the packer resulting in a socalled "shingling" or "saw-tooth" effect on the side of the bale opposite the knife. This problem is more prevalent when baling grass hay ultimately causing the bale to have non-uniform density and irregular shape.

SUMMARY OF THE INVENTION

An important object of the present invention is to provide a baler having improved feeder capability in which uniform bale shape and density is more consistently realized. More specifically, a feeder is provided that is more reliable in crop types and conditions that in the past resulted in a build up in the transition area in the vicinity of the bale case inlet.

In pursuance of this and other important objects the present invention provides an improvement for a baler of the type comprising, a bale case having a crop inlet, a feed platform adjacent the bale case, a pickup in front of the platform for lifting crop material to the feed platform, first feed means including a first set of crop engaging tines for moving crop material across the feed platform toward the bale case, second feed means, intermediate the first feed means and the bale case, having a second set of crop engaging tines for moving crop material across the platform from the first feed means into the crop inlet in the bale case, and drive means connected to the first and second feed means for driving the first and second set of crop engaging tines through endless paths each having arcuate portions in the vicinity of feed platform and along which the first and second sets of tines travel in the general direction of the bale case, the paths of the second set passing through the inlet in the bale case, the second set of tines being offset from the first set transversely relative to the general direction crop is being urged across the platform. Unique filler means are affixed to the platform to improve feeding. According to its broadest aspects the improvement contemplates filler means comprising a generally wedge shaped element affixed to the feed platform to fill the space between the arcuate portions of the endless paths and the floor to prevent crop buildup in such space.

The foregoing and other objects, features and advantages of the invention will appear more fully hereinafter from a consideration of the detailed description which follows, in conjunction with the accompanying sheets of drawings wherein one principal embodiment of the invention is illustrated by way of example.

DESCRIPTION OF THE PREFERRED EMBODIMENT

Figure 1:
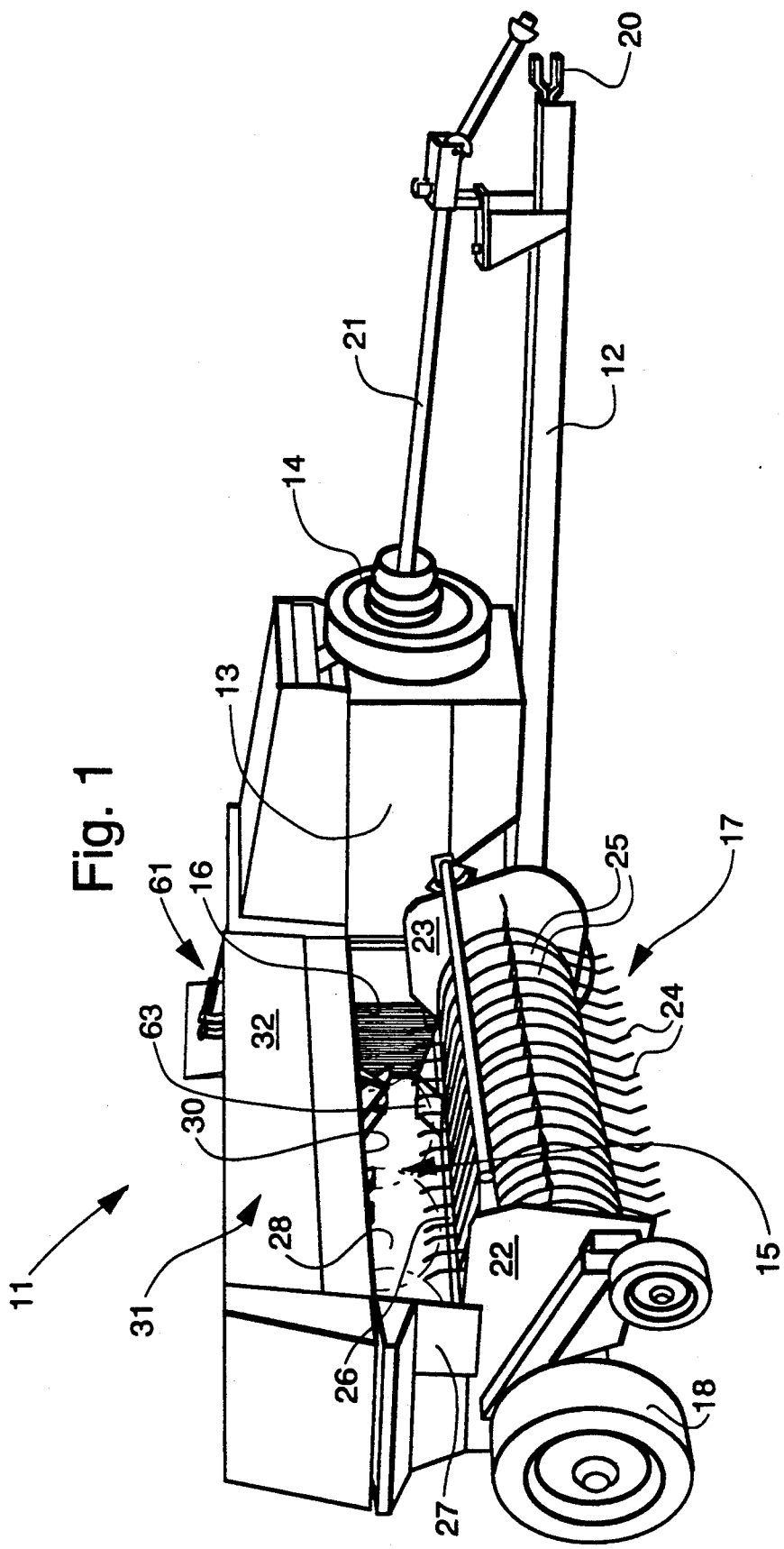
FIG. 1 is a perspective view of a square baler in which the present invention is embodied.

Referring now to the drawings for a more detailed description of the invention, FIG. 1 shows a baler 11 having feed means in which the preferred embodiment of the invention is embodied. Baler 11 includes a tongue 12 extending forwardly of the baler for attachment to a tractor (not shown), a fore-and-aft bale case or chamber 13 having a forward end on which flywheel 14 is rotatably mounted and a feed housing or chamber 15 (extending transversely of the baler)within which is mounted feed means, described below. The feed means are adapted to convey crop material into bale case 13 through an inlet opening 16 therein. A rotatable crop pickup mechanism 17 mounted forwardly of and below the feed housing 15 is adapted to lift crop material from the field and deliver it to the feed means in a conventional manner.

A plunger (not shown) is mounted for reciprocal movement in bale case 13 for forming crop material conveyed therein through inlet opening 16 into rectangular bales. As a bale is being formed in bale case 13 it moves progressively toward the rear and when completed it is banded with a suitable tying medium and subsequently emerges from the rear or discharge end of the bale case.

The baler is supported by a pair of ground engaging wheels 18 (one shown) and, when articulately connected at the hitch end 20 of its tongue 12 to the drawbar of the tractor, it may be towed across a field. An input driveline 21 is connected at its rear end to flywheel 14 and adapted for connection at its forward end to a power-take-off shaft (not shown) of the tractor for rotation in unison therewith to supply rotary driving power to the operating components of baler 11.

Pickup mechanism 17 comprises a conventional reel (not shown) rotatable on a shaft, the axis of which is transverse to the longitudinal axis of bale case 13. This shaft (also not shown) is journalled in bearings carried on a pair of spaced side walls 22, 23. The reel has a plurality of outwardly projecting tines 24 which project between a plurality of arcuate stripper plates 25. Crop material elevated by tines 24 is moved over plates 25 and delivered rearwardly to a crop receiving platform 26 which extends transversely from the bale case in a horizontal plane contiguous with the lower end of inlet opening 16.

Disposed around platform 26 is a housing having an upwardly projecting side wall 27, a vertical rear wall 28 and a slotted generally horizontal top wall 30. This housing forms feed chamber 15 which receives crop material from pickup mechanism 17. Mounted above top wall 30 of feeder chamber 15 is upper housing 31 including a front wall 32.

Figure 2:
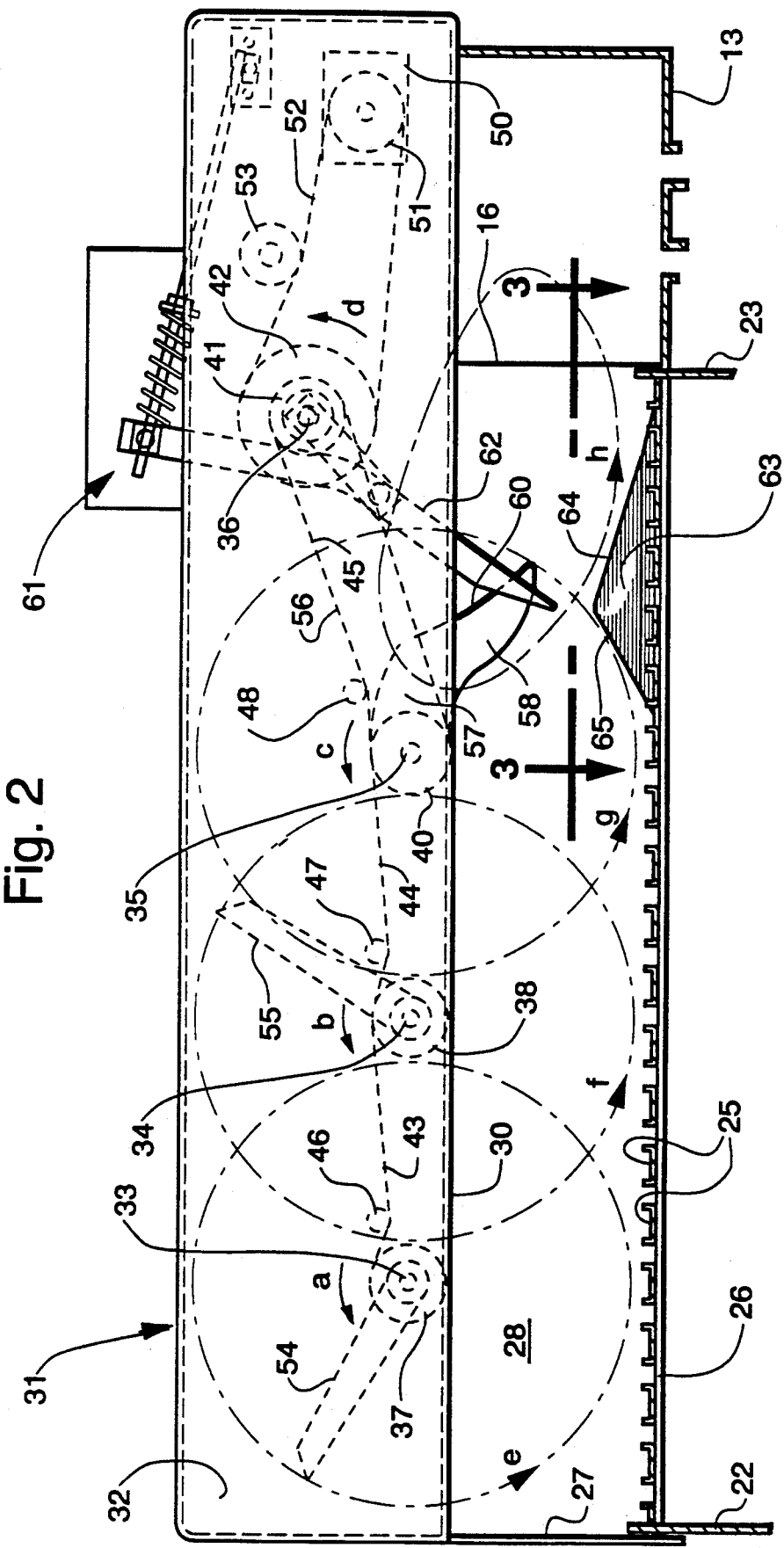
FIG. 2, a front elevational view of the baler shown in FIG. 1, shows the improved feeder system in further detail.

Turning now to FIG. 2, transversely spaced apart shafts 33, 34, 35, 36 are rotatably mounted within upper housing 31. The axes of the shafts are oriented generally in a fore-and-aft direction of baler 11. A sprocket 37 is mounted on shaft 33, pairs of sprockets 38, 40 are fixed on shafts 34, 35, respectively, and sprockets 41, 42 are mounted on shaft 36. Chains 43, 44, 45 extend around sprocket 37, sprocket pairs 38, 40 and sprocket 41. Reference is made to U.S. Pat. No. 4,488,636, which is hereby incorporated by reference, wherein a similar feeder system is disclosed in detail in which a similar sprocket and chain drive is shown. Tensioning sprockets 46, 47, 48 are provided to take up the slack in chains 43, 44, 45.

Motive power is supplied from the input drive line 21 to a gear box 50 mounted on bale case 13. A sprocket 51 is provided on the gear box 50. A chain 52 extends around sprocket 51 (on the gear box) and sprocket 42, the outer sprocket on shaft 36. A tensioning sprocket 53 takes up the slack in chain 52. Sprockets 37, 38, 40, 41 are the same diameter so that shafts 33, 34, 35, 36 will rotate at the same speed. Furthermore, the four shafts will rotate in the same direction, i.e., counterclockwise, as indicated by direction arrows a, b, c and d in FIG. 2.

Each of the shafts 33, 34, 35 carries a set of three parallel feeder tines 54, 55, 56, respectively, spaced apart along such shafts in the space between front wall 32 and rear wall 28. Tine sets 54, 55 on shafts 33, 34 extend radially therefrom. The tines in feeder tine set 56 on shaft 35 each have a radially extending arm section 57 mounted on shaft 35 and a tine section 58 extending at an obtuse angle to arm section 57. Each tine section 58 has a leading edge 60 which in operation precedes the path of a straight line extending from shaft 35 to the tip of tine section 58. Finally, shaft 36 carries a fork feed mechanism 61 including a packer tine set 62 comprising a set of three parallel tines spaced apart along a shaft. This feeder mechanism 61 operates in a known fashion to drive packer tines 62 along the oval path depicted. For example, U.S. Pat. No. 3,570,395 mentioned above shows a prior art feeder system having a packer employing a fork feed mechanism.

Again referring to FIG. 2, the feeder means depicted more particularly comprises three rotary feed mechanisms operating in concert with a fork feed mechanism. The rotary feeders urge crop along the platform by means of contact first via tines 54, then tines 55, then tines 56 and finally packer tines 62 engage the crop so conveyed and feed it into bale case 13. This crop conveyance and packing, which is well known in the art, is illustrated by the paths of movement e, f, g and h of the tips of feeder tine sets 54, 55, 56 and packer tine set 62, respectively, which paths overlap each other when seen in the axial direction of the shafts. The tines of each set are disposed so they pass closely alongside the corresponding tines of adjacent sets to provide a stripping or combing off action while avoiding direct interference during crop conveyance. For example, the tines of set 56 are in the overlapping position relative to packer tine set 62 showing the position whereby tine set 56 has just competed the process of being stripped by packer tine set 62.

Figure 3:
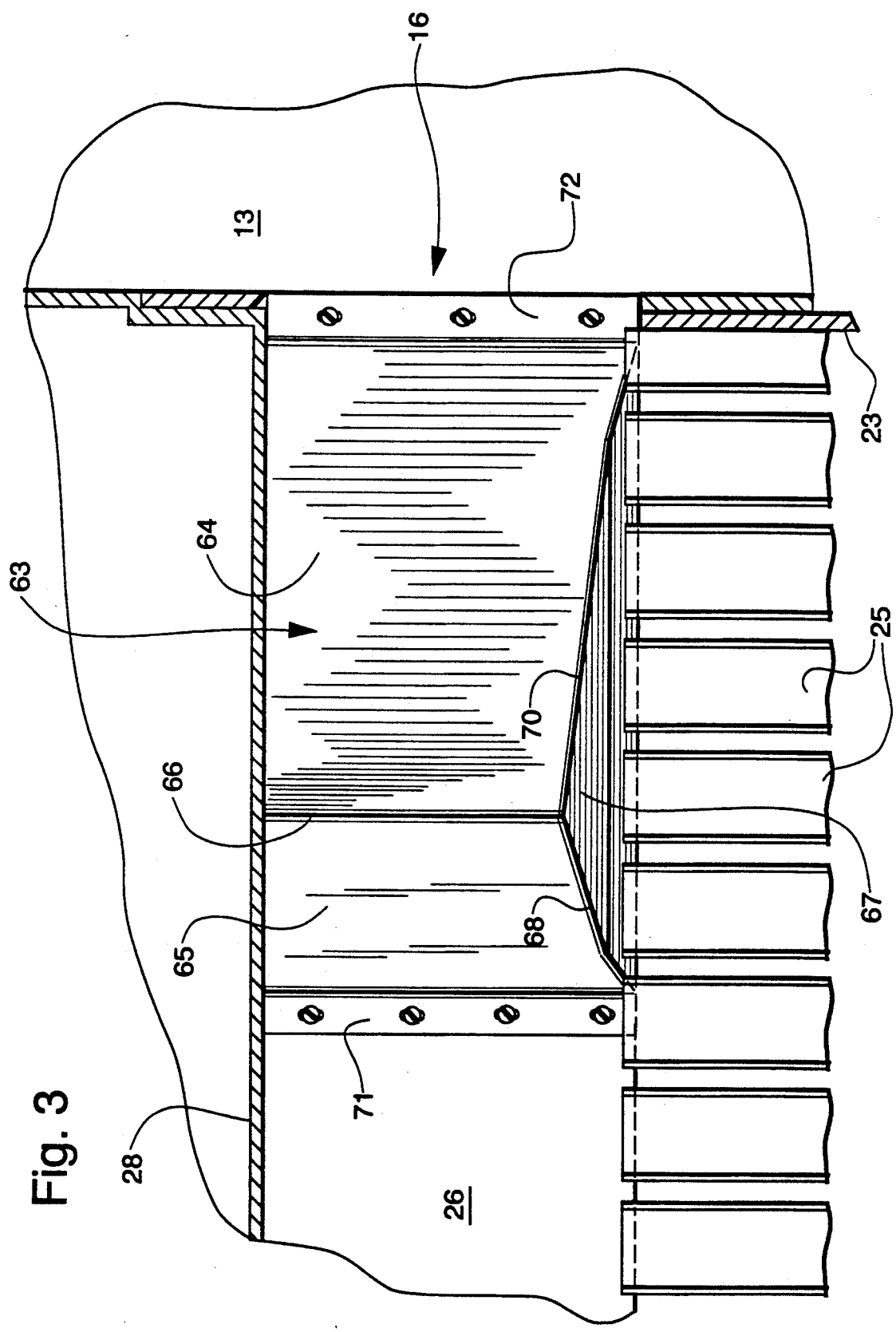
FIG. 3 is a view taken in the direction of arrows 3—3 of FIG. 2.

Now turning to the improved structure of the present invention, a filler element 63 is shown in FIGS. 2 and 3 affixed to crop receiving platform 26. Filler element 63 is generally wedge shaped in configuration and comprises a first inclined surface 64, a second inclined surface 65 having a common edge 66 with first surface 64, and a third inclined surface 67 having a common edge 68 with the second surface and a common edge 70 with the first surface. The element is secured to platform 26 via a flange 71 extending from second inclined surface 65 and a flange 72 extending from first inclined surface 64 along the bottom edge of inlet opening 16.

In operation, tines move crop progressively from left to right (with respect to FIG. 2) conveying it via the leading edges thereof during travel through the lower portions of paths e to f to g and finally to packer tine path h. Each set of tines strips the preceding set, as described above and as illustrated by the position of tines 56 with respect to packer tines 62, where the stripping function has just been completed. When packer tines 62 feed into chamber 13 it is important for bale shape that all crop material conveyed from left to right in a particular sequence is packed into the bale case and not left at the transition for the next packing stroke. To this end filler element 63 prevents build up of crop material that has been conveyed to the packer. The space between platform 26, oval path h of packer tines 62 and circular path g of tines 56 has been filled with an element having a first surface 64 that is configured generally similar to the lower portion of packer tine path h and a second inclined surface 65 that is configured generally similar to adjacent part of the lower portion of tine path g. A third inclined surface is provided to permit crop being conveyed along stripper plates 25 adjacent filler element 63 to be conveyed upwardly and rearwardly to first and second inclined surfaces 64 and 65, respectively. This enhances the smooth efficient flow of crop being fed to the feeder in the vicinity of the right side of the pickup.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, what is claimed is:

1. In a baler comprising,
    a bale case having a crop inlet,
    a feed platform adjacent said bale case,
    a pickup in front of said platform for lifting crop material to said feed platform,
    first feed means including a first set of crop engaging tines for urging crop material across said feed platform toward said bale case,
    second feed means, intermediate said first feed means and said bale case, having a second set of crop engaging tines for urging crop material across said platform from said first feed means into said crop inlet in said bale case,
    drive means connected to said first and second feed means for driving said first and second set of crop engaging tines through endless paths each having arcuate portions in the vicinity of said feed platform and along which said first and second sets of tines travel in the general direction of said bale case, the paths of said second set passing through said inlet in said bale case, and
    said second set of tines offset from said first set transversely relative to the general direction crop is being urged across said platform,
    the improvement comprising
    filler means comprising a generally wedge shaped element affixed to said feed platform to fill the space between said arcuate portions of said endless paths and said feed platform to prevent crop buildup in said space.

2. In a baler as set forth in claim 1 wherein the paths of said first set of tines and said second set of tines overlap and said second set strips crop material from said first set during the time the path of said second set of tines intersects the path of said first set until said second set reaches the point of departure of said overlap.

3. In a baler as set forth in claim 2 wherein said drive means drives said first set of tines in a generally circular path around a horizontal axis.

4. In a baler as set forth in claim 3 wherein said drive means drives said second set of tines in a generally oval path.

5. In a baler as set forth in claim 2 wherein said filler means includes an inclined surface sloped downwardly in the direction of said inlet.

6. In a baler as set forth in claim 5 wherein said inclined surface is generally rectangular and includes a lower edge portion that is disposed in the vicinity of said inlet.

7. In a baler as set forth in claim 6 wherein said generally rectangular surface includes an upper edge generally beneath the point of departure of said overlap.

8. In a baler as set forth in claim 5 wherein said filler means further includes a second inclined surface contiguous with said inclined surface and sloped downwardly and rearwardly away from said inclined surface.

9. In a baler as set forth in claim 8 wherein said point of departure of said overlap is generally above and adjacent said area of said filler where said inclined surface and said second inclined surface are contiguous.

10. In a baler as set forth in claim 9 wherein said filler means further includes a third inclined surface being upwardly and rearwardly inclined from said pickup.

11. In a baler as set forth in claim 8 wherein said filler means further includes a third inclined surface being upwardly and rearwardly inclined from said pickup.

12. In a baler comprising,
    a bale case having a crop inlet,
    a feed platform adjacent said bale case,
    a pickup in front of said platform for lifting crop material to said feed platform,
    first feed means for urging crop material across said feed platform toward said bale case,
    second feed means, intermediate said first feed means and said bale case, having a set of crop engaging tines for urging crop material across said platform from said first feed means into said crop inlet in said bale case,
    drive means connected to said second feed means for driving said set of crop engaging tines through endless paths each having arcuate portions in the vicinity of said feed platform and along which said tines travel in the general direction of said bale case, the paths of said tines passing through said inlet in said bale case, and
    said paths of said tines also passing through crop material being urged across said platform by said first feed means,
    the improvement comprising
    filler means comprising a generally wedge shaped element affixed to said feed platform to fill the space between said arcuate portions of said endless paths and said feed platform to prevent crop buildup in said space.

13. In a baler as set forth in claim 12 wherein the paths of said set of tines strips crop material from said first feed means during the time the path of said set of tines is in the vicinity of said feed platform.

14. In a baler as set forth in claim 13 wherein said drive means drives said set of tines in a generally oval path around a horizontal axis.

15. In a baler as set forth in claim 13 wherein said filler means includes an inclined surface sloped downwardly in the direction of said inlet.

16. In a baler as set forth in claim 15 wherein said inclined surface is generally rectangular and includes a lower edge portion that is disposed in the vicinity of said inlet.

17. In a baler as set forth in claim 15 wherein said filler means further includes a second inclined surface contiguous with said inclined surface and sloped downwardly and rearwardly away from said inclined surface.

18. In a baler as set forth in claim 17 wherein said filler means further includes a third inclined surface being upwardly and rearwardly inclined from said pickup.

* * * * *